United States Patent [19]

Saitou et al.

[11] 4,300,178
[45] Nov. 10, 1981

[54] MULTICHANNEL MAGNETIC HEAD

[75] Inventors: Sinichi Saitou, Hachioji; Misao Shimoda, Tokyo, both of Japan

[73] Assignee: Olympus Optical Co., Ltd., Tokyo, Japan

[21] Appl. No.: 973,964

[22] Filed: Dec. 28, 1978

[30] Foreign Application Priority Data

Feb. 27, 1978 [JP] Japan .................................. 53-21788

[51] Int. Cl.³ ............................ G11B 5/28; G11B 5/25
[52] U.S. Cl. .................................... 360/121; 360/122; 360/125
[58] Field of Search ..................... 360/125, 121–123, 360/119

[56] References Cited

FOREIGN PATENT DOCUMENTS 526005 11/1976 U.S.S.R. ............................. 360/121

OTHER PUBLICATIONS

IBM/TDB vol. 15, No. 6, Nov. 1972, "Interleaved Multielement Magnetic Head" by Kington.
IBM/TDB vol. 9, No. 7, Dec. 1966, "Edge Effect Magnetic Recording" by Dawson et al., Primary Examiner—John H. Wolff

[57] ABSTRACT

A multichannel magnetic head with a plurality of U-shaped cores each contacting at both ends a magnetic tape, in which the plurality of cores are arranged in two series, as viewed in the head face, in such a manner that one end of two legs of each core in one series is disposed between the ends of two adjacent legs of a core or cores in the other series.

3 Claims, 6 Drawing Figures

MULTICHANNEL MAGNETIC HEAD

BACKGROUND OF THE INVENTION

The invention relates to a multichannel magnetic head with a plurality of U-shaped cores.

A multichannel magnetic head with a plurality of U-shaped cores has been used widely in conventional record/ playback apparatus of various types. The U-shaped cores are used for contacting at both leg ends the recording face of the magnetic tape and develop a magnetic field orthogonal to the recording face of the magnetic tape, providing a record/playback with a high accuracy.

When the interval between the legs of the U-shaped core is too short, the flux density extending from the leg ends of the magnetic core to the magnetic tape is reduced, thus deteriorating the accuracy of the record/playback. Conversely, when the interval is too long, the size of the core is large so that the magnetic head into which the magnetic cores are assembled is large in size and thus the magnetic tape used must be wider in width. Accordingly, the magnetic head using such magnetic cores is expensive.

SUMMARY OF THE INVENTION

Accordingly, an object of the invention is to provide a multichannel magnetic head with a plurality of U-shaped cores which may be small-sized without reduction of the magnetic flux passing through the magnetic tape.

According to the invention, there is provided a multichannel magnetic head with a plurality of U-shaped cores each having a pair of legs with leg ends in contact with a magnetic tape, comprising a head body with a head face and a plurality of U-shaped cores arranged in two series within said head body, as seen when looking at or against the head face, in such a manner that one end of two legs of each core in one series is disposed between the ends of two adjacent legs of a core or cores in the other series.

Other objects and features of the invention will be apparent from the following description taken in connection with the accompanying drawings, in which:

DESCRIPTION OF THE PREFERRED EMBODIMENTS

Figure 1:
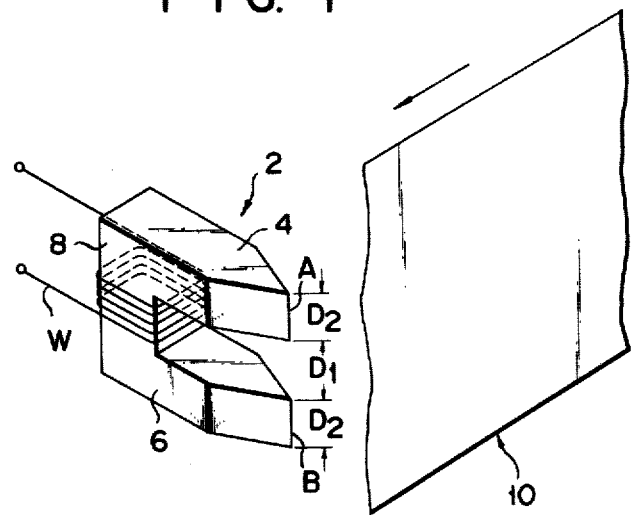
FIG. 1 shows a perspective view of a core used in the multichannel magnetic head according to the invention.

Referring now to FIG. 1, there is shown a schematic view of a U-shaped core 2 which is incorporated into a magnetic head according to the invention. The legs 4 and 6 of the U-shaped core 2 are each wedge-shaped to have edges A and B. The connecting part 8 connecting both the legs 4 and 6 is wound by an exciting coil W. In the physical dimension, the size D1 between the legs 4 and 6 is selected to be slightly longer than D2 of each A and B. With respect to the core 2, a magnetic tape 10 is transporated in the direction of the arrow shown, in contact with the edges A and B.

Figure 2:
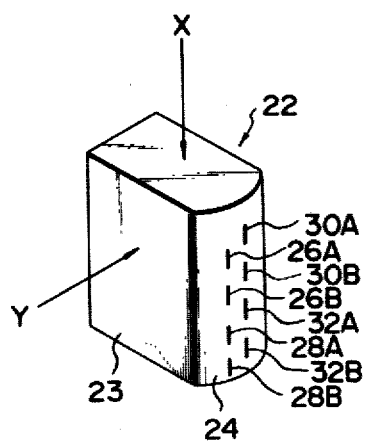
FIG. 2 shows a perspective view of a magnetic head with a plurality of cores shown in Fig. 1, which is an embodiment according to the invention.

A magnetic hed 22 shows in perspective in FIG. 2, includes four U-shaped cores as shown in FIG. 1. A head body designated by reference numeral 23 has a head face 24 from which the edges 26A, 26B, 28A, 28B, 30A, 30B, 32A and 32B of four cores 26, 28, 30 and 32 slightly project. As well illustrated in FIG. 3, the four cores 26, 28, 30 and 32 are parallel arranged in two series in the longitudinal direction of the head face 24.

The arrangement of the four cores 26, 28, 30 and 32 will be described with reference to FIGS. 3 to 5. As seen at the head face 24 of the magnetic head 22, the four cores 2 are arranged in two series and in parallel, two series cores being disposed slightly spaced from each other with a shield plate 34 interposed therebetween. In FIG. 4 is illustrated an arrangement of the cores 2 assembled in the head 22, in relation to a magnetic tape 10 contacting the head face 24 and as viewed in the direction of arrow X in FIG. 2. The cross sectional view of FIG. 5 is as viewed in the direction of arrow Y in FIG. 2.

Figure 3:
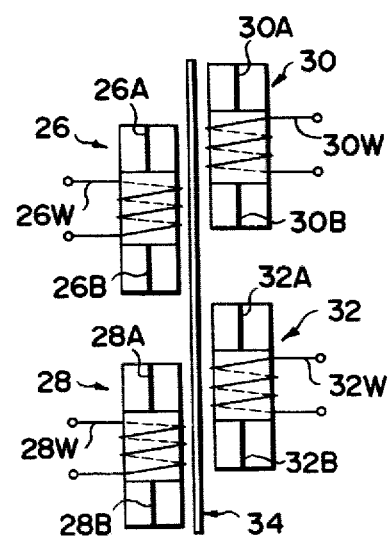
FIG. 3 shows a schematic diagram, as viewed against the head face, for illustrating an arrangement of cores in the magnetic head.
Figure 4:
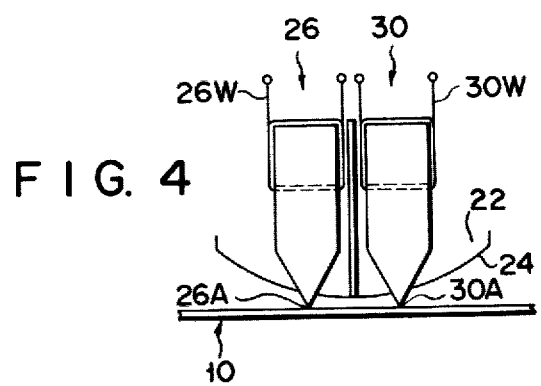
FIG. 4 shows a schematic diagram, as viewed in the direction of arrow X in FIG. 2, for illustrating the same.

As shown in FIG. 3, four cores are divided into two series each including cores 26 and 28, and 30 and 32, respectively. These series are disposed in parallel with repsect to the shield plate 34. Although briefly mentioned above, note here that the cores 2 are so arranged that the top ends of the legs are not aligned face to face with respect to the shield plate 34. In other words, the magnetic cores 2 are disposed in zig-zag fashion with respect to the shield plate 34, as viewed against the head face 24. Accordingly, the leg end 26A of the core 26 is disposed between the leg ends 30A and 30B. The leg end 26B is disposed between the leg ends 30B of the core 30 and the leg end 32A of the core 32. Further, the leg end 28A is disposed between the leg ends 32A and 32B of the core 32.

As well illustrated in FIG. 4 depicting only two cores 26 and 30, the edges of the leg ends 26A and 30A slightly project from the head face 24 and contact the face of the running tape 10.

Figure 5:
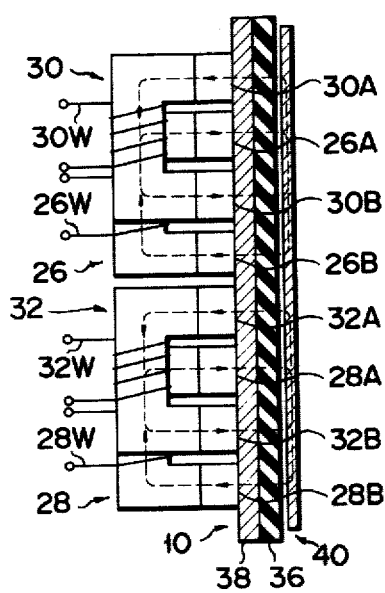
FIG. 5 shows a schematic diagram, as viewed in the direction of arrow Y in FIG. 2, for illustrating the same.

Referring to FIG. 5, there are illustrated four magnetic cores 26, 28, 30 and 32 in contact with the magnetic tape 10 which also is illustrated in cross section. As shown, the magnetic tape 10 comprises a substrate 36 made of plastic , for example, and an anisotropic magnetic layer 38 which is layered on the substrate 36 and magnetized normal to the tape running direction. A high magnetic permeability plate 40 is disposed at the other side of the substrate 36.

When current is fed to the respective coils 26W, 28W, 30W, and 32W of the cores 26, 28, 30 and 32, magnetic fluxes as indicated by dash lines are established. The magnetic flux of each magnetic path emanating from one leg end, projects into the magnetic tape 10 normal to the tape running direction, and returns to the other leg end through the high magnetic permeability plate 40 and the magnetic tape 10. With such a construction, the interval between the leg ends of each core is not shortened so that information may accurately be recorded on the magnetic layer 38.

Figure 6:
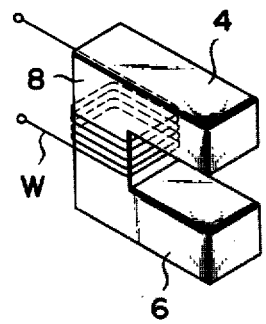
FIG. 6 shows a perspective view of another embodiment of a magnetic head according to the invention.

The arrangement of the magnetic cores in zig-zag fashion provides a high accuracy recording because there is no reduction of magnetic flux and a small-size magnetic head. The wedge-shaped leg end improves the magnetic flux density. The leg end of the core may also be shaped flat as shown in FIG. 6. The number of the cores assembled into the magnetic head is not limited to four as in the above embodiment. The invention is also applicable a magnetic head with two or more cores.

What is claimed is:

1. A multi-channel magnetic head for contacting a magnetic tape having a recording face, comprising: a core housing having an elongated head face, and a plurality of U-shaped cores arranged in said housing, each core being wound by an exciting coil and the free ends of each said cores defining a pair of spaced legs for contacting at their free ends the recording face, said U-shaped cores being arranged in two parallel rows on opposite sides of a line extending essentially along the center of said elongated face, the space between the legs of one and the same core being substantially the same as the width of the legs, the legs of one and the same core being on the same side of said line, and staggered with respect to the legs of an adjacent core on the opposite side of said line, so that each leg engages a different track of the tape.

2. A multichannel magnetic head according to claim 1, in which the leg ends of each core in the two rows are wedge-shaped to have an edge.

3. A multichannel magnetic head according to claim 1, in which the leg ends of each core in the two rows are flat.

* * * * *